Patented July 22, 1941

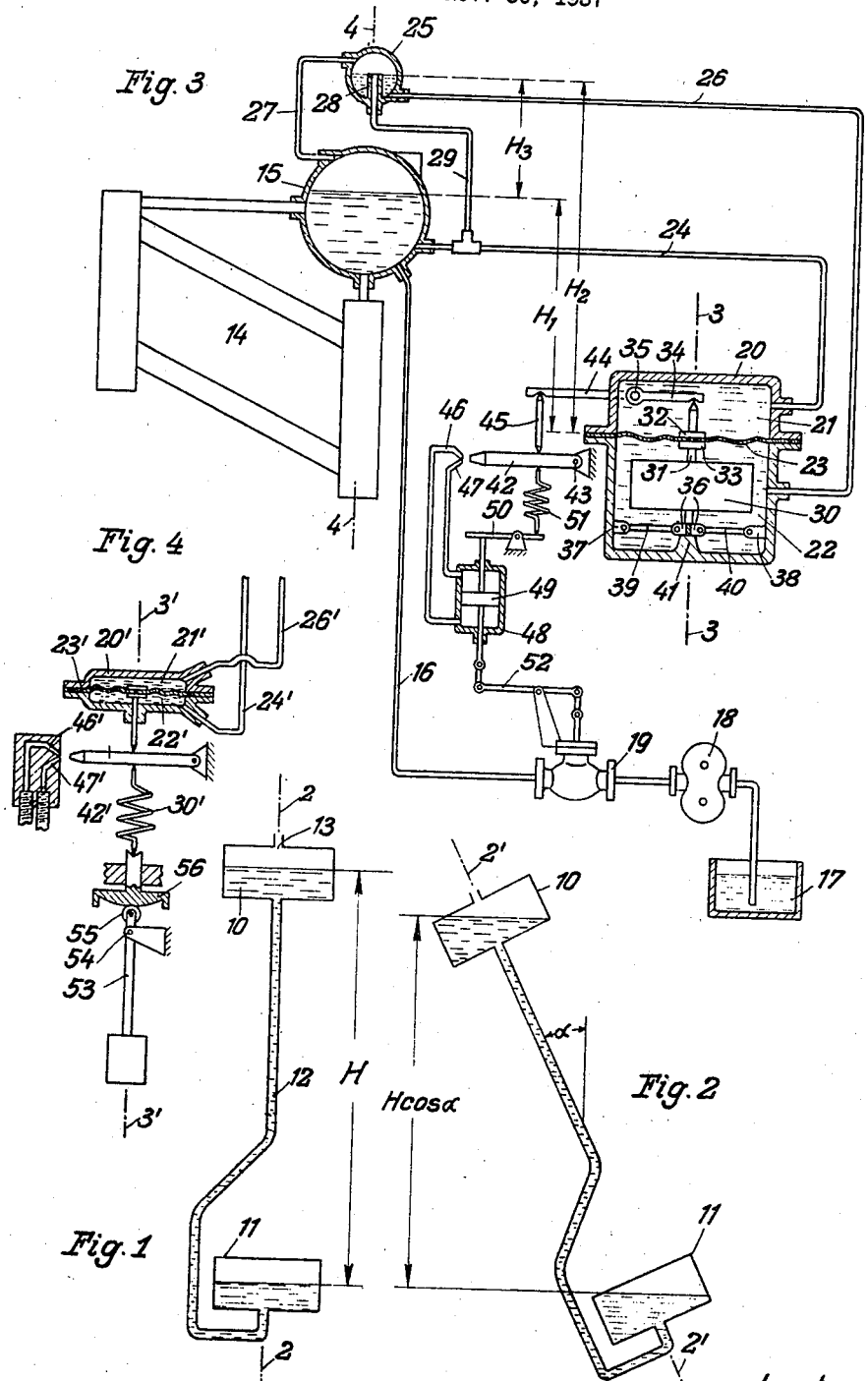

2,250,341

UNITED STATES PATENT OFFICE 2,250,341

LIQUID COLUMN RESPONSIVE DEVICE

Guido Wünsch, Berlin-Steglitz, Germany, assignor to Askania-Werke A. G. vormals Centralwerkstatt-Dessau und Carl Bamberg-Friedenau, a corporation of Germany Application November 30, 1937, Serial No. 177,393
In Germany December 4, 1936

15 Claims. (Cl. 122—451)

This invention relates to improvements in liquid column responsive devices, more particularly to devices for determining the volume of a liquid contained in a vessel by measuring the length of a liquid column.

Aims, objects, and advantages of this invention will appear from a consideration of the description which follows with accompanying drawing illustrating the principle of this invention and showing for purely illustrative purposes apparatus embodying the present invention. It is to be understood, however, that the description is not to be taken in a limiting sense, the scope of this invention being defined in the appended claims.

Referring to the drawing:

Figs. 1 and 2 are diagrammatic illustrations for the purpose of explaining the principle of this invention.

Fig. 3 is a diagrammatic illustration of a liquid column responsive device employed for the purpose of maintaining constant the water level in a boiler.

Fig. 4 is a diagrammatic view partly in section showing a modified form of liquid column responsive device for use in the apparatus of Fig. 3.

For an illustration of the principle and the objects of this invention it may be assumed that two vertically spaced vessels 10 and 11 connected by a conduit 12 are filled with a liquid through an opening 13 in the upper vessel. The liquid will compress the air in the lower closed vessel 11 and the length of the liquid column H between the upper and the lower liquid level is a measure of the volume of liquid contained in the vessels. The pressure of the air trapped in the lower vessel 11 may be regarded as a further measure of the volume of liquid. When the axis 2—2 of the system of vessels is inclined with regard to the vertical, as shown in Fig. 2, it is easily seen that the length of the liquid column is decreased in response to the inclination. Assuming the axis 2—2 be inclined by an angle $\alpha$ with regard to the vertical to assume a new position 2'—2', the length of the liquid column is reduced to $H \cos \alpha$. According to well-known laws of hydromechanics the pressure inside the lower vessel 11 will aso be reduced in response to reduced length of the liquid column.

As a practical application of this principle it may be assumed that an automatic feed water regulator for boilers be installed on board ship and that the regulator be controlled in response to variations in the length of a liquid column extending from the water level in the boiler to a point of measurement below the boiler. It is easily understood that the length of the controlling liquid column is constantly varied when the ship pitches or rolls. The feed water regulator will accordingly be actuated although the actual volume of water in the boiler may remain unchanged.

It is accordingly an object of this invention to provide an improved liquid column responsive device which will permit a correct measurement of the volume of the liquid contained in a vessel, such as a boiler, irrespective of changes of the water level due to inclinations of the vessel or the liquid column.

A similar problem is presented in apparatus for measuring the volume of fuel contained in fuel tanks on board aircraft. In devices of the latter kind often the principle illustrated in Fig. 1 is employed in that the pressure of a trapped volume of gas is measured which is compressed by the weight of the fuel. It is accordingly a further object of this invention to provide an improved device permitting a correct measurement of the volume of fuel in tanks on board aircraft.

According to this invention an improved liquid column responsive device is provided by making the device not only responsive to changes in the length of the liquid column, but also to the inclination of the liquid column, thus compensating for errors introduced into the measurement by inclinations.

In Fig. 3 an improved liquid column responsive device is shown as applied to a system for maintaining constant the volume of water in a boiler. The boiler whose feed water supply is to be regulated is indicated diagrammatically at 14. Feed water is supplied to a boiler drum 15 through a pipe 16 from a water reservoir 17 by means of a pump 18. A valve 19 in the pipe 16 controls the flow of feed water to the drum and is controlled, in turn, by a regulator now to be described.

The liquid column responsive device for controlling the regulator is shown in the illustrated embodiment as comprising a pressure proof casing 20 separated into chambers 21 and 22 by a flexible diaphragm 23. The upper chamber 21 is in communication with the water in the drum 15 through a conduit 24 and a conduit 27 is in communication with the container 25 permitting steam to enter the container. Steam will condense in the container and fill the same with water up to the certain level which is determined by the length of an overflow tube 28 through which an excess of water may flow to the water drum through a pipe 29. The pipe 26 permits water to flow into the lower chamber 22 which is likewise filled with water.

Accordingly a pressure will exist in the upper chamber 21 and act on the diaphragm 23 in a downward direction which is equal to the steam pressure and a pressure exerted by a liquid column $H_1$ between the diaphragm 23 and the water level in the drum. In the lower chamber 22 a pressure exists and acts on the diaphragm in an upward direction which is equal to the pressure of the steam and the pressure exerted by a water column of constant length $H_2$ between the diaphragm and the water level in the container 25. As the steam pressure acts on the diaphragm 23 in both directions, the steam pressure is compensated and the diaphragm will respond only to changes in the length of the water columns $H_1$ and $H_2$. The distance $H_3$ between the water levels thus becomes a measure of the volume of water contained in the boiler in that upon an increase in water the distance $H_3$ is decreased and vice versa. Furthermore the resultant pressure on the diaphragm 23 is equal to the pressure of a water column having the length of $H_3$.

Force exerting means are provided for acting on the diaphragm 23 in opposition to the differential pressure created by the water columns. In the illustrated example a weight 30 having a central stem 31 is connected to the diaphragm by means of flanges 32 and 33. The upper end of the stem 31 engages a lever 34 pivoted at 35. The lower end of the stem is provided with lugs 36 and movably connected to fixed lugs 37 and 38 in the casing by means of links 39 and 40. A boss 41 in the casing 20 serves as a stop limiting downward movements of the diaphragm and the weight. The weight 30 is thus guided by means of the lever 34 and the links 39 and 40 to move only in one direction designated by the axis 3—3. The play in the pin connections between the lugs 36 and 37, 38 and the links 39 and 40 is made sufficiently large to permit of slight movements in the axial direction 3—3. The lever 34 and the links 39 and 40 will not, however, permit substantial movements of the weight in a direction normal to the axis 3—3. When the axis 3—3 is inclined with regard to the vertical, the lever and the links will receive the component of the force exerted by the weight which acts in a direction normal to the axis 3—3, while only the second component acting in the axis 3—3 is allowed to act on the diaphragm. In other words the force of the weight on the diaphragm is decreased in response to inclinations of the device. It appears that in an extreme position in which the axis 3—3 is horizontal the force exerted by the weight on the diapragm will become zero.

The liquid column responsive device is connected to act on a relay. In the illustrated embodiment a pressure fluid operated relay of the well-known Askania jet-pipe type is shown comprising a jet-pipe 42 pivoted at 43 and supplied with pressure fluid from a suitable source (not shown). The relay is actuated by the liquid column responsive device through a lever 44 on the shaft 35 and an intermediate link 45. The jet-pipe issues a jet of pressure fluid into reception orifices 46 and 47 depending upon the relative position of the jet-pipe and the orifices. The reception orifices are in communication with a servo-motor 48 having a movable piston 49. In a well-known manner the servo-motor is connected to act on the relay by means of a restoring connection comprising in the illustrated example a double armed lever 50 and a spring 51. It appears that the movements of the servo-motor are thus controlled by the differential pressure created by the jet-pipe in the reception orifices 46 and 47. The servo-motor controls the position of the valve 19, the piston being connected to the valve through a link connection 52 for this purpose.

It is to be understood that the liquid column responsive device is mounted so that it takes part of the movements of the boiler in which the water is caused to rise or fall in response to the inclination movements. The axis of the boiler, in the illustrated example designated as 4—4, is for this purpose arranged to be parallel to the axis 3—3 of the liquid column responsive device. The relations of the boiler axis and the axis of the liquid column responsive device is to be such in the illustrated example that the action of the weight 30 on the diaphragm 23 is a maximum when the axis 4—4 of the boiler is perpendicular. When the boiler is inclined, it is apparent that the pressure on the diaphragm 23 will be decreased in that the active length of the liquid column $H_3$ which may be regarded as representing the resultant liquid column is reduced by the cosine of the angle of inclination. The force of the weight 30 of the inclined liquid column responsive device will accordingly be reduced in an equal degree, whereby the movements of the diaphragm become proportional to the volume of water in the boiler.

The operation of the device is as follows:

Assuming first that the axes 3—3 and 4—4 be perpendicular a drop of the water level in the drum 15 will result in the decrease in pressure in the chamber 21. Accordingly, the diaphragm 23 will move in an upward direction turning the lever system 34 and 44 counter-clockwisely and causing the jet-pipe to register with the orifice 47. The servo-motor piston 49 is caused to move downwardly opening the valve 19 to admit feed water to the boiler. Simultaneously, the double armed lever 50 is turned counter-clockwise increasing the tension of the spring 51 and restoring the relay to a normal position for the purpose of preventing a "hunting" or "overshooting" of the regulator.

When the boiler and the liquid column responsive device are inclined, the action of the hypothetical water column $H_3$ is decreased by the cosine of the inclination angle. As the force of the weight 30 loading the diaphragm is reduced in an equal degree no actuation of the feed water regulator results from an inclination of the boiler and the control device operates as though no inclinations take place at all.

A modified form of liquid column device is shown in Fig. 4. A differential pressure diaphragm 23' enclosed in a casing 20' and forming chambers 21' and 22' therewith is connected to act on a relay 42'. Conduits for connecting the differential pressure diaphragm with a boiler drum and a water container for maintaining constant a water column are indicated at 46' and 47'. Instead of loading the diaphragm by means of a weight the force of which on the diaphragm is decreased in response to the inclinations, in the modified embodiment, a spring 30' is employed. Obviously, either a compression or a tension spring may be used for this purpose. In this instance, a compression spring is arranged below the jet pipe and its force or compression is adjustable in response to inclinations of the device. In the illustrated embodiment, a pendulum 53 pivoted at 54 and having a roller 55 is shown as actuating a cam member 56. When the cam member is moved in an upward direction, the force of the spring 30' is increased and vice versa. Assuming the liquid pressure responsive device having an axis 3'—3' be inclined, the pendulum 53 will become inclined with respect to the axis 3—3 and cause the roller 55 to travel on the surface of the cam member 56. The cam member is thereby caused to move in a downward direction decreasing the force of the spring 30'. The surface of the cam member is so shaped as to cause a reduction of the spring force by the cosine of the inclination angle to render the relay 42' non-responsive to such changes in pressure on the diaphragm 23' resulting from an inclination of the water column.

Obviously, the present invention is not restricted to the particular embodiments herein shown and described. Moreover, it is not indispensable that all the features of this invention be used conjointly, since they may be employed advantageously in various combinations and subcombinations.

I claim as my invention.

1. Liquid column responsive device which, in use, is capable of being inclined with respect to the vertical comprising, in combination, a movable diaphragm connected to be acted upon by the pressure of a liquid column; a weight acting on said diaphragm in opposition to the pressure of the column; and supporting and guiding means for supporting and guiding said weight for movement in one axis and receiving the component of the force exerted by said weight in a direction normal to said axis, whereby a reduced force of the weight which is a function of the inclination acts on said diaphragm upon inclination of said device.

2. Liquid column responsive device which, in use, is capable of being inclined with respect to the vertical comprising, in combination, a movable diaphragm connected to be acted upon by the pressure of a liquid column; a spring acting on said diaphragm in opposition to the pressure of the column; and means responsive to inclinations of the device with regard to the vertical and connected to adjust the force of said spring.

3. Liquid column responsive device comprising, in combination, a movable diaphragm connected to be acted upon by the pressure of a liquid column; a spring acting on said diaphragm in opposition to the pressure of the column; a pendulum; and cam means arranged to be actuated in response to inclinations of said pendulum for adjusting the force of said spring.

4. Liquid column responsive device comprising, in combination, a casing which, in use, is capable of being inclined relative to the vertical; a diaphragm mounted in said casing and forming two chambers therewith; a weight connected to act on said diaphragm; and means for suspending the weight inside said casing and having guide means connecting the weight with the sides of the casing for movement in only one direction, whereby the force of the weight acting on said diaphragm becomes a function of the inclination of the casing with regard to the vertical.

5. A feed water system for boilers comprising in combination; a feed water pipe, a valve in said pipe, a liquid column responsive device including a movable diaphragm connected to be acted upon by the pressure of the liquid column, means connected to control said valve, said means being actuated by said diaphragm, a weight connected to act on said control means in opposition to said diaphragm; and supporting means for supporting said weight for movement in one axis and receiving the component of the force exerted by said weight in a direction normal to said axis.

6. A feed water system for boilers comprising in combination; a feed water line, a valve in said line, a liquid column responsive device having a movable diaphragm connected to be acted upon by the pressure of the liquid column, means connected to control said valve, said means being actuated in response to movements of said diaphragm, a spring acting on said control means in opposition to said diaphragm and means responsive to inclinations of the system with regard to the vertical and connected to adjust the force of said spring.

7. A feed water system for boilers as claimed in claim 6, in which cam and pendulum means are provided to be displaced in response to inclinations of the pendulum means for adjusting the force of said spring.

8. A feed water system for boilers comprising a feed water pipe, a valve in said pipe, a liquid column responsive device for controlling said valve, means for compensating the influence of an inclination of the liquid column on said liquid column responsive device, said means including means for exerting a counter-force on said liquid column responsive device in opposition to the pressure of said liquid column, said counter-force being a function of the inclination of said liquid column.

9. A feed water system for boilers comprising a feed water pipe, a valve in said pipe, a liquid column responsive device for controlling said valve, means for compensating the influence of an inclination of the liquid column on said liquid column responsive device, said means including a weight for exerting a counter-force on said liquid column responsive device in opposition to the pressure of the liquid column, and supporting means for supporting said weight for movement in one axis and for receiving the component of the force exerted by said weight in a direction normal to said axis.

10. Liquid column responsive device comprising, in combination, means confining a liquid column which, in use, is liable to inclinations with respect to the vertical; a movable member connected to be acted upon by the pressure of said liquid column; and means responsive to inclinations of said column with respect to the vertical for exerting on said member in opposition to said liquid pressure a counter-force which is a function of the inclination, whereby changes in pressure of said liquid column acting on said member and resulting from inclinations of said column may be compensated.

11. Apparatus for indicating or regulating the height of a liquid column which, in use, is liable to inclinations with respect to the vertical, more particularly for indicating or regulating the water level of ships' boilers, including means subject to the pressure difference produced by said liquid column and a standard liquid column, said pressure difference being a measure of the liquid column to be measured or regulated; and a weight member acting on said means in opposition to said pressure difference, the opposing action of said weight member varying when the inclination to the vertical of said liquid column to be measured or regulated varies so as to compensate, at least approximately, for variations in said pressure difference due to changes in inclination.

12. Liquid column responsive device according to claim 1, in which the guiding means is in the form of a pair of links.

13. Liquid column responsive device according to claim 1, in which the casing is provided with a stop to limit the downward movement of the weight in the casing, and in which the guide means includes a pair of links secured to the sides of the casing with slight play.

14. Liquid column responsive device comprising, in combination, means confining a liquid column which, in use, is capable of being inclined with respect to the vertical and which is provided with means to maintain two permanent liquid levels in the column regardless of inclinations of the device; a movable member connected to be acted upon by the pressure of said liquid column and responsive to changes between the liquid levels; and means responsive to inclinations of said column with respect to the vertical for exerting on said member in opposition to said liquid pressure a counter-force which is a function of the inclination, whereby changes in pressure of said liquid column acting on said member and resulting from inclinations of said column may be compensated.

15. Apparatus for indicating or regulating the height of a liquid column which, in use, is capable of being inclined with respect to the vertical, more particularly for indicating or regulating the water level of ships' boilers, including means to maintain two liquid levels in the column; means subject to changes between the liquid levels and thereby the pressure difference produced by said liquid column and a standard liquid column whose quantity of liquid remains the same regardless of inclinations, said pressure difference being a measure of the liquid column to be measured or regulated; and a weight member acting on said means in opposition to said pressure difference, the opposing action of said weight member varying when the inclination to the vertical of said liquid column to be measured or regulated varies so as to compensate, at least approximately, for variations in said pressure difference due to changes in inclination.

GUIDO WÜNSCH.